United States Patent [19]
Song et al.

[11] Patent Number: 5,562,936
[45] Date of Patent: Oct. 8, 1996

[54] CONTINUOUS CHEWING GUM BASE MANUFACTURING PROCESS USING HIGHLY DISTRIBUTE MIXING

[75] Inventors: Joo H. Song, Northbrook; Donald J. Townsend, Chicago, both of Ill.

[73] Assignee: Wm. Wrigley Jr. Company, Chicago, Ill.

[21] Appl. No.: 126,319

[22] Filed: Sep. 24, 1993

[51] Int. Cl.⁶ .................................................. A23G 3/30
[52] U.S. Cl. .......................... 426/3; 426/4; 426/5; 426/6; 426/516
[58] Field of Search .................................. 426/3–6, 516; 425/204, 208; 264/211

[56] References Cited

U.S. PATENT DOCUMENTS

| | | | |
|---|---|---|---|
| 1,852,005 | 4/1932 | Garbutt | 426/5 |
| 1,953,295 | 4/1934 | Garbutt | 426/5 |
| 2,256,190 | 9/1941 | Bowman | 107/54 |
| 3,995,064 | 11/1976 | Ehrgott et al. | 426/3 |
| 4,068,004 | 1/1978 | Carlin et al. | 426/3 |
| 4,187,320 | 2/1980 | Koch et al. | 426/3 |
| 4,208,431 | 6/1980 | Friello et al. | 426/3 |
| 4,217,368 | 8/1980 | Witzel et al. | 426/5 |
| 4,305,962 | 12/1981 | del Angel | 426/3 |
| 4,452,820 | 6/1984 | D'Amelia et al. | 426/3 |
| 4,459,311 | 7/1984 | DeTora et al. | 426/3 |
| 4,514,423 | 4/1985 | Tezuka et al. | 426/3 |
| 4,555,407 | 11/1985 | Kramer et al. | 425/5 |
| 4,876,095 | 10/1989 | Yang | 426/3 |
| 4,968,511 | 11/1990 | D'Amelia et al. | 426/6 |
| 5,045,325 | 9/1991 | Lesko et al. | 426/5 |
| 5,059,103 | 10/1991 | Bruckmann et al. | 425/67 |
| 5,135,760 | 8/1992 | Degady et al. | 426/5 |
| 5,158,725 | 10/1992 | Handa et al. | 264/40 |
| 5,324,530 | 1/1994 | Kehoe et al. | 426/516 |

FOREIGN PATENT DOCUMENTS

| | | |
|---|---|---|
| 0273809A2 | 7/1988 | European Pat. Off. . |
| 2635441 | 2/1990 | France . |
| 1538785 | 1/1979 | United Kingdom . |
| 2049705 | 12/1980 | United Kingdom . |

OTHER PUBLICATIONS

Brochure by BUSS AG entitled "Extrusion Processing of Shear–Sensitive Food Products," 23 pages, Nov. 1987.
*Food Manufacturing*, "Extrusion: does chewing gum pass the tast test?" pp. 48–50, Sep. 1987.
Two page document entitled "Mixing Processes used in the Manufacture of Chewing Gum," by R. Schilling, undated.
Three page letter from Buss America dated Aug. 22, 1989 describing Buss kneading extruder and its uses.
Brochure entitled "D–TEX Continuous Compounding Twin Screw Extruders," 4 pages, published by Davis–Standard (undated).
Brochure entitled "Farrel–Rockstedt Twin–Screw Extruders," 6 pages, published by Farrel Corporation (undated).
Brochure entitled, "Leistritz Extrusionstechnik, The Universal Laboratory Extruder System," 24 pages, published by American Leistritz Extruder Corporation (undated).
Brochure entitled, "Leistritz Extrusionstechnik, The Multi–Extrusion–System for Mixing–, Kneading–and Strandextrusion ZSE GG+GL," 20 pages, published by American Leistritz Extruder Corporation (undated).
Two page document from Rubber Extrusion Technology program, dated Feb. 8–10, 1993.

*Primary Examiner*—Esther M. Kepplinger
*Assistant Examiner*—Lien Tran
*Attorney, Agent, or Firm*—Steven P. Shurtz; Brinks Hofer Gilson & Lione

[57] ABSTRACT

A process for continuously producing a chewing gum base comprises the steps of continuously adding an elastomer, a filler and a plasticizer into a continuous mixer, subjecting the elastomer, filler and plasticizer to a highly distributive mixing operation and continuously discharging the resulting chewing gum base from the mixer while the adding and mixing steps are in progress.

20 Claims, 3 Drawing Sheets

_(5,562,936)_

CONTINUOUS CHEWING GUM BASE MANUFACTURING PROCESS USING HIGHLY DISTRIBUTE MIXING

FIELD OF THE INVENTION

This invention is directed to a continuous process for the manufacture of chewing gum bases.

BACKGROUND OF THE INVENTION

A typical chewing gum base includes one or more elastomers, one or more fillers, one or more elastomer solvents, plasticizers and optional plastic polymers, waxes, emulsifiers and miscellaneous colors, flavors and antioxidants. Due primarily to the difficulty in melting and dispersing the elastomers homogeneously among the other gum base ingredients, gum base manufacture has typically been a tedious and time-consuming batch process. For example, one such conventional process uses a sigma blade batch mixer having a front to rear blade speed ratio of about 2:1, and a mixing temperature of about 80°–120° C.

In this conventional process, initial portions of elastomer, elastomer solvent and filler are added to the heated sigma blade mixer and blended until the elastomer is melted or smeared and thoroughly mixed with the plasticizer and fillers. Then the remaining portions of elastomer, elastomer solvent, plasticizer, fillers, emulsifiers and other ingredients are added sequentially, in a stepwise fashion, often with sufficient time for each stepwise addition to become completely mixed before adding more ingredients. Depending on the composition of the particular chewing gum bases and, in particular, the amount and type of elastomer, considerable patience may be required to insure that each ingredient becomes thoroughly mixed. Overall, anywhere from one to four hours of mixing time can be required to make one batch of chewing gum base using a conventional sigma blade mixer.

After mixing, the molten gum base batch must be emptied from the mixer into coated or lined pans, or pumped to other equipments such as a holding tank or a filtering device, then extruded or cast into shapes, and allowed to cool and solidify, before being ready for use in chewing gum. This additional processing and cooling requires even more time.

Various efforts have been undertaken to try to simplify and reduce the time required for gum base manufacture. European Patent Publication No. 0 273 809, in the name of General Foods France, discloses a process for making nonadhesive chewing gum base by blending elastomer and filler components together in an industrial mill type mixer to form a nonadhesive premix, dividing the premix into fragments, and blending the premix fragments and at least one other nonadhesive gum base component together in a powder mixer. Alternatively, the premix fragments and other base components can be added to an extruder along with other chewing gum components to accomplish direct manufacture of chewing gum.

French Patent Publication No. 2 635 441, also in the name of General Foods France, discloses a process for making a gum base concentrate using a twin screw extruder. The concentrate is prepared by mixing high molecular weight elastomers and plasticizers in desired proportions and feeding them into the extruder. Mineral fillers are added to the extruder downstream of the feed inlet of the elastomer/plasticizer blend. The resulting gum base concentrate has a high level of elastomers. The concentrate can then be mixed with the other gum base ingredients to provide a complete gum base.

U.S. Pat. No. 4,968,511, issued to D'Amelia et al., discloses that chewing gum can be made directly in a one-step compounding process (without making an intermediate gum base) if certain vinyl polymers are used as the elastomer portion.

U.S. No. Pat. No. 4,187,320, issued to Koch et al., discloses a two-stage process for making a chewing gum base in a mixing kettle.

U.S. Pat. No. 4,305,962, issued to del Angel, discloses a process for making an elastomer/resin masterbatch as a precursor to a gum base.

U.S. Pat. No. 4,459,311, issued to DeTora et al., discloses making gum base using two separate mixers—a high intensity mixer for pre-plasticizing the elastomer in the presence of a filler, followed by a medium intensity mixer for ultimately blending all the gum base components together.

Several publications disclose that a continuous extruder can be used to make the ultimate chewing gum product after a separate process has previously been used to make the chewing gum base. These publications include U.S. Pat. No. 5,135,760, issued to Degady et al.; U.S. Pat. No. 5,045,325, issued to Lesko et al., and U.S. Pat. No. 4,555,407, issued to Kramer et al.

Notwithstanding the prior efforts described above, there is a need and desire in the chewing gum industry for a continuous process which can effectively and efficiently be used to make a variety of complete chewing gum bases without limiting the type or quantity of elastomer employed, and without requiring preblending or other pretreatment of the elastomer. It would be particularly beneficial to be able to produce high quality chewing gum bases that incorporate waxes, fats and/or oils as plasticizers in the gum using a continuous process.

SUMMARY OF THE INVENTION

The present invention is a continuous process of making a chewing gum base which is suitable for use with any conventional gum base elastomer, in any conventional amount, without requiring preblending or pretreatment of the elastomer with any other ingredient. For instance, the present invention can be used for the continuous manufacture of a wide variety of gum bases which include many or all of the following components, in the following percentages:

| Component | Range (% by weight) |
| --- | --- |
| Elastomer(s) | 5.0–95 |
| Elastomer Solvent(s) | 0–50 |
| Plasticizer(s) | 0–75 |
| Wax(es) | 0–30 |
| Emulsifier(s) | 0.5–40 |
| Filler(s) | 1.0–65 |
| Colorant(s)/flavor(s) | 0–3.0 |

The present invention has several different aspects, which can be employed together, separately, or in any combination. All of these aspects can be performed together, in sequence, using a single continuous mixing process, preferably carried out in a twin-screw extruder.

In a first aspect of the invention, the elastomer, elastomer solvent and filler are continuously mixed together under conditions of highly dispersive mixing. By "highly dispersive mixing" it is meant that the elastomer, elastomer solvent and filler are broken down into very small particles, droplets or "domains" which readily become dispersed among themselves and which can later be distributed, substantially homogeneously, among the other gum base ingredients. This dispersive mixing stage can be thought of as a disentanglement and "breaking down" stage for the gum base components which are the most difficult to disperse. Special mixing elements are used for this purpose, as discussed below in the detailed description of the presently preferred embodiments.

In a second aspect of the invention, the chewing gum base ingredients are added sequentially to the continuous extruder, at different locations, in an order which approximately corresponds to a decreasing order of viscosity. The relatively high viscosity chewing gum base ingredients (for example, most elastomers) are added to the extruder first with filler and elastomer solvent, at an upstream location, and are mixed together. The filler and elastomer solvent help disperse the elastomer. The intermediate viscosity gum base ingredients (for example, polyvinyl acetate, low molecular weight elastomers and elastomer solvents) are added to the extruder second, at an intermediate location, and are mixed with the high viscosity ingredients previously added. The relatively low viscosity gum base ingredients (for example, oils, fats and waxes) are added to the extruder third, at a downstream location, and are mixed with the high and intermediate viscosity ingredients previously added.

In a third aspect of the invention, the elastomer, elastomer solvent, filler, any intermediate viscosity ingredients (for example, polyvinyl acetate) and, optionally, low viscosity ingredients (for example, fats, oils and waxes) are continuously mixed together under conditions of highly distributive mixing. By "highly distributive mixing" it is meant that the ingredients are spread out or "distributed" among each other to form a substantially homogeneous chewing gum base blend. By way of analogy, the "dispersive mixing" stage, described above, causes the elastomer, using the filler as a processing aid for dispersive mixing, to be "broken down" into very small particles, droplets or domains. The "distributive mixing" stage, which occurs further downstream in the continuous process, causes these very small particles, droplets or domains to become evenly distributed among the remaining gum base ingredients.

In a fourth aspect of the invention, volatile components of the gum base mixture are continuously removed during the extrusion process. These volatile components include unwanted degradation products; for example, degraded elastomer, elastomer solvent or plasticizer, which occur in small amounts from the mixing process. Removal of the volatile components helps eliminate undesirable off-notes from the flavor of the chewing gum base. This can be accomplished, for example, by pulling a vacuum on the extruder upstream from where the polyvinyl acetate is added. If the degradation products are allowed to mix with polyvinyl acetate, they become very difficult to remove.

In a fifth aspect of the invention, low and/or medium viscosity ingredients are injected in a liquid state under pressure, using a pump. The liquid state can be achieved by premelting an ingredient such as polyvinyl acetate or wax, or by lowering the viscosity of a fat or oil, using one or more heated feed tanks. The injection of a liquid under pressure facilitates more precise metering and better mixing and distribution of the low and medium viscosity ingredients.

The invention has numerous advantages. First, chewing gum base is produced in a continuous process. If desired, the output can be used to supply a continuous chewing gum production line. Second, the average residence time for gum base ingredients is reduced from hours to minutes. Third, all of the necessary addition and compounding steps can be performed in sequence using a single continuous mixing apparatus. Fourth, the preferred embodiment provides improved metering and mixing of intermediate and low viscosity gum base ingredients by adding these ingredients in the liquid state under pressure. Fifth, the invention is effective for a wide range of gum base compositions, including different gum base elastomers and elastomer percentages, without requiring preblending or other pretreatment of the elastomers. Sixth, the gum base can be produced on demand, eliminating finished base inventory. This allows maximum flexibility to react to market demands and formula changes.

The foregoing and other features and advantages of the invention will become further apparent from the following detailed description of the presently preferred embodiments, read in conjunction with the accompanying examples and drawings.

DETAILED DESCRIPTION OF THE DRAWINGS AND PREFERRED EMBODIMENTS OF THE INVENTION

The chewing gum base made by the process of the present invention will be the same as bases made by conventional processes, and can thereafter be made into conventional chewing gums, including bubble gum, by conventional methods. The details of such chewing gums and methods of production are well known and therefore not repeated here. Of course, specialized chewing gum, such as nonadhesive chewing gum and bubble gum, will use specialized gum base ingredients. However, those gum base ingredients can be combined using the processes herein described.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Elastomers may include polyisobutylene, butyl rubber (isobutylene-isoprene copolymer) and styrene butadiene rubber, as well as natural latexes such as chicle. Elastomer solvents are often resins such as terpene resins. Plasticizers are typically fats and oils, including tallow, hydrogenated and partially hydrogenated vegetable oils, and cocoa butter. Commonly employed waxes include paraffin, microcrystalline and natural waxes such as beeswax and carnauba.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Emulsifiers, which also sometimes have plasticizing properties, include glycerol monostearate, lecithin and glycerol triacetate. Further, gum bases may also contain optional ingredients such as antioxidants, colors and flavors.

The insoluble gum base may constitute between about 5 to about 80 percent by weight of the gum. More typically the insoluble gum base comprises between 10 and 50 percent by weight of the gum and most often about 20 to about 35 percent by weight of the gum.

Figure 1:
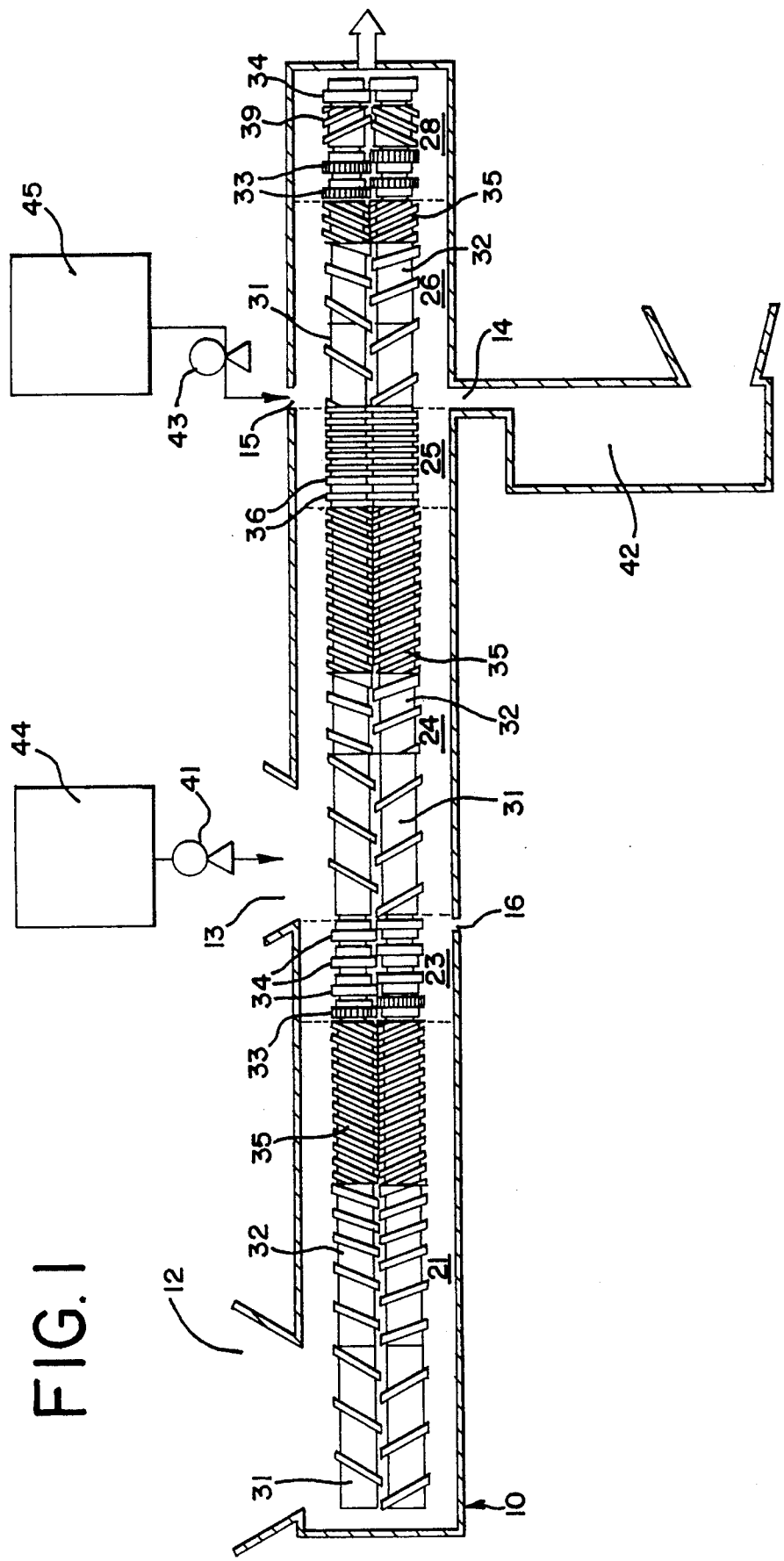
FIG. 1 depicts a schematic representation of a twin screw extruder set up for use in practicing the present invention.

The preferred process of the present invention is carried out a twin screw extruder such as depicted schematically in FIG. 1. The twin screw extruder used to practice the preferred embodiment of the invention will be set up with several different feed inlet locations where chewing gum base ingredients can be added. The screws inside the barrel of the extruder are equipped with different types of elements along the length of the screws. The different sections are sometimes referred to as processing sections, and described by the type of elements employed in the sections. The barrel for the extruder is typically divided into zones that may be heated or cooled independent of other zones. These heating zones may or may not coincide with processing sections, depending on the lengths of the barrel zone sections and the elements in the processing sections.

While different equipment manufacturers make different types of elements, the most common types of elements include conveying elements, compression elements, reverse elements, homogenizing elements such as shearing disks and toothed elements, and kneading disks and blocks. Conveying elements generally have flights spiraling along the elements with wide gaps between the flights. These elements are used at feed inlet sections to quickly move material into the body of the extruder. Compression elements have flights with a pitch that narrows as the material moves along the flights. This results in compression and high pressure in the forward direction, which is required to force material downstream and through the other elements. Reverse elements have flights that are angled opposite those of the conveying elements. The flights rotate in a direction that would force material upstream. These elements provide a high back pressure and slow down movement of the material through the extruder. Of course, the extruded material still works its way opposite the flights to move downstream through the reverse elements. A reverse helical arrangement of kneading blocks can accomplish a similar result.

Figure 2:
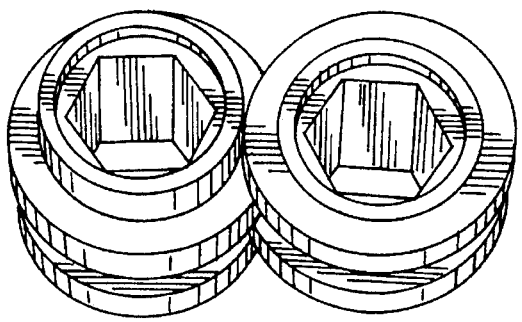
FIG. 2 depicts a set of shearing disks used in the extruder of FIG. 1.
Figure 3:
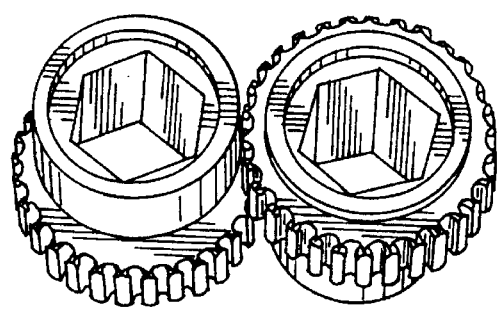
FIG. 3 depicts a set of toothed elements used in the extruder of FIG. 1.
Figure 4:
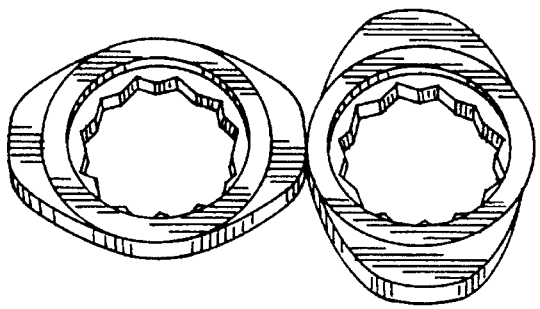
FIG. 4 depicts a set of kneading disks used in the extruder of FIG. 1.
Figure 5:
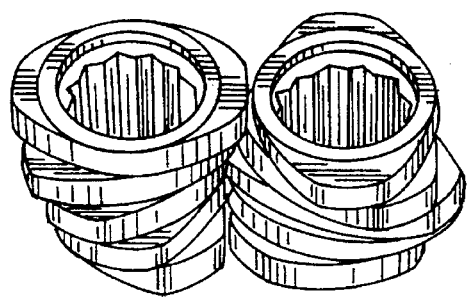
FIG. 5 depicts a plurality of kneading disks, set up in a helical fashion, to form kneading blocks.

Shearing disks, as their name implies, impart high shearing forces on the material in the extruder, resulting in highly dispersive mixing. In a twin screw extruder, the shearing disks opposite one another on the two different screws have close fitting disk/slot elements, as depicted in FIG. 2. Toothed elements, as depicted in FIG. 3, have gear-like teeth that oppose a cylindrical spacer shaft on the other screw. Toothed elements impart highly distributive mixing. Often the toothed elements are made in matched sets, with a cylindrical shaft portion and a toothed portion as one unit. Kneading disks, as shown in FIG. 4, have an elliptical shape, and produce a kneading action in the material passing through the extruder. Often a plurality of kneading disks will be placed next to each other in a helical arrangement, as shown in FIG. 5, referred to as kneading blocks.

Highly distributive mixing can also be accomplished using reverse conveyance elements that have portions missing from the flights to allow flow counter to the direction of compression. These missing portions may be arranged as a groove through the flights cut parallel to the length of the element. Also, kneading blocks followed by reverse conveyance elements, to build up high back pressure, also produce highly distributive mixing.

These elements, and other elements useful in twin screw extruders, are well known in the art and are commercially available. The elements are often specifically designed for the different types of commonly available twin screw extruders, which include co-rotation, counter rotation, intermeshing and tangential twin screw extruders. Elements intended for similar functions will vary in design depending on the type of extruder for which they are intended.

One specific type of element for a specific brand of extruder is a non-intermeshing polygon element sold by the Farrel Corporation, 25 Main Street, Ansonia, Conn. 06401, for the Farrel-Rockstedt co-rotating twin screw extruder. It is believed that the non-intermeshing polygons produce dispersive mixing.

In preferred embodiments of the invention, the dispersive mixing disentangles the elastomers with a minimum amount of degradation of the polymer chains. Thus, while dispersive mixing will inevitably reduce the molecular weight of the polymer, it is preferable to control the dispersive mixing operation to minimize this molecular weight reduction. Preferably, the average molecular weight will not be reduced below the average molecular weight of the same polymers mixed into gum base using conventional processes.

An adequate dispersive mixing will produce a smooth, rubbery fluid, with no detectable lumps of rubber. If only a few lumps of rubber are present they may be screened out or dispersed during subsequent mixing steps. However, if the number or size of lumps is excessive, or the processed elastomers and fillers are in the form of an agglomeration or grainy mass, the dispersive mixing applied is inadequate.

The distributive mixing should be sufficient to produce a homogeneous gum base, rather than a material that appears to be "sweating", or that has a marbled or swiss cheese texture. In the preferred embodiment of the invention, the highly distributive mixing is sufficient to incorporate plasticizers, particularly fats, oils and waxes, to the same degree these plasticizers are incorporated in conventional chewing gum base manufacturing processes.

As shown in FIG. 1, for practicing a first preferred embodiment of the invention, a twin screw extruder 10 is set up with a first feed inlet location 12 adjacent a first processing section 21 fitted with conveying elements 31, conveying and compression elements 32 and compression elements 35. The second processing section 23 is equipped with a combination of toothed elements 33, as depicted in FIG. 3, and several sets of shearing disks 34, as depicted in FIG. 2. At the end of the second processing section 23 the extruder 10 is equipped with a port 16 which is connected to a vacuum source (not shown). The third processing section 24 contains additional conveying elements 31, conveying and compression elements 32 and compression elements 35. A second feed inlet 13 is provided in the extruder adjacent this second set of conveying elements 31, for feeding additional gum base ingredients into the third processing section 24. Feed inlet 13 allows for the addition of powdered ingredients as well as liquid ingredients from pump 41. The fourth processing section 25 is fitted with kneading disks 36. At the beginning of the fifth processing section 26, the twin screw extruder 10 has another inlet 15 connected to a pump 43 and a feed inlet 14 in the form of a port connected to a side feeder 42, which may be a single or twin screw extruder, or even a gear pump which can generate high pressure. The fifth processing section 26 is fitted with conveying elements 31, conveying and compression elements 32 and compression elements 35, which force the gum base ingredients into the sixth and final processing section 28. Section 28 contains two sets of toothed elements 33, followed by reverse elements 39 and shearing disks 34. After passing through the shearing disks 34, the gum base ingredients exit the extruder 10.

It may be preferable to heat some of the ingredients, either to melt them or lower their viscosity. As shown in FIG. 1, the extruder 10 may be set up with heated tanks 44 and 45, connected respectively to pumps 41 and 43, for this purpose. Other commonly used equipment, such as equipment to monitor the temperature and heat or cool the extruder, is not shown in FIG. 1. The equipment will also include conventional weighing and feeding devices for continuously adding granulated or powdered ingredients at a controlled, monitored rate.

It will be understood that FIG. 1, as a schematic representation, shows the various components in their respective order from the standpoint of flow through the extruder 10. Typically the screws are mounted in a horizontal side-to-side position and feed inlets, especially those open to the atmosphere like the inlet 12 and 13, are placed vertically above the screws.

While the arrangement of FIG. 1 is preferred for particular gum bases outlined in the examples below, other arrangements may be preferred for other gum bases. FIG. 1 depicts an extruder with three general areas of ingredient addition and six processing sections. For some gum bases, two, four or more ingredient feeding sections may be used, with different numbers of processing sections. FIG. 1 also depicts the use of one set each of long conveying elements 31, conveying and compression elements 32 and compression elements 35 in the first processing section 21, a short set of conveying and compression elements 32 in sections 24 and 26, and a short set of conveying elements 31 and compression elements 35 in section 26. In reality, one, two or more elements of different types and length may be used in these sections. FIG. 1 also depicts one set of toothed elements 33 and three sets of shearing disks 34 in section 23, but different numbers of these elements, or different elements all together, may be used. Likewise in sections 25 and 28, different types of elements that produce distributive mixing may be used, dependent on the gum ingredients being mixed in those sections and the type of extruder being used.

Figure 6A:
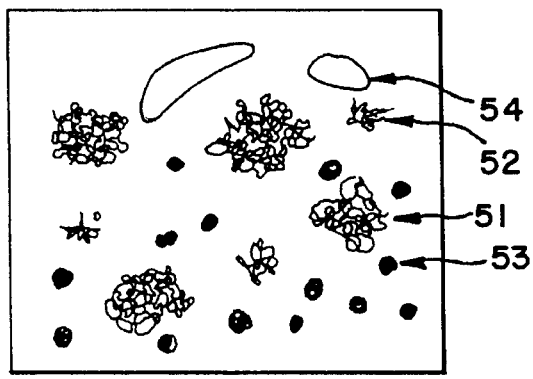
FIGS. 6a–e depict schematic sequential representations of gum base ingredients during the mixing process.
Figure 6B:
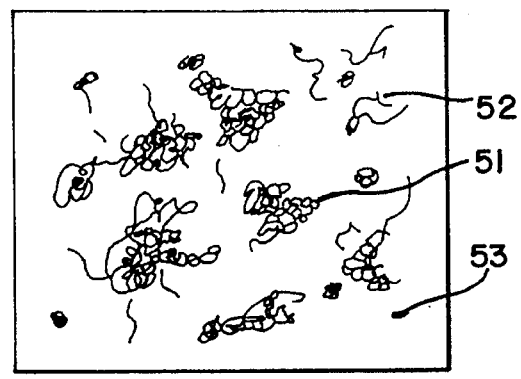
Figure 6C:
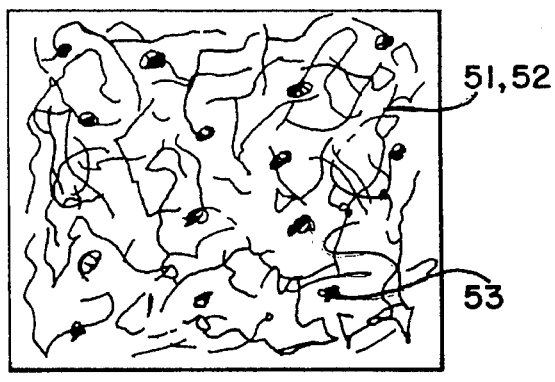

FIGS. 6a–e represent the state of various gum base ingredients as they are compounded into chewing gum base. At the beginning, as shown in FIG. 6a, the high molecular weight elastomer 51 and medium molecular weight elastomer 52 are both in the form of granules or particles in which the elastomer molecules are tightly bound together. The filler 53 is in particulate form, but may not be homogeneously mixed with the elastomers 51 and 52. The elastomer solvent 54 may be present in the form of droplets. As mixing begins, depicted in FIG. 6b, the elastomer solvent 54 becomes associated with the elastomers 51 and 52. With the presence of the filler 53, elastomer solvent 54 and heat, the granules begin to come apart into individual elastomer molecules. Also, the filler 53 becomes more evenly distributed, and may have its particle size reduced. As the process continues, the elastomers 51 and 52 become disentangled, as shown in FIG. 6c. This disentangling is the result of subjecting the elastomers 51 and 52 to highly dispersive mixing.

Figure 6D:
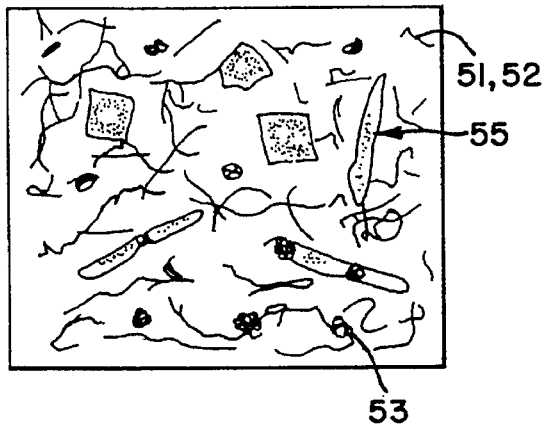
Figure 6E:
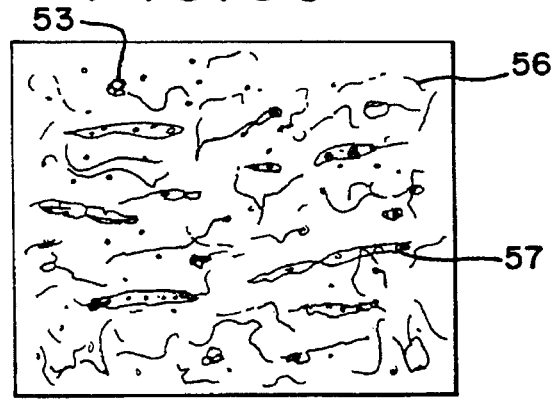

After this step, the lower viscosity ingredients, such as polyvinyl acetate 55, may be added, as shown in FIG. 6d. Initially, this material will also be in discrete particles, or droplets as it melts. Further mixing and further ingredient additions, such as waxes 56 and emulsifiers 57, are subjected to distributive mixing, as depicted in FIG. 6e. Continued highly distributive mixing produces a homogeneous chewing gum base, wherein discrete particles or droplets are not detectable by sensory perception.

The elastomer may be added at the first feed inlet 12 along with elastomer solvent such as resins and the filler. However, especially lower weight elastomers may be added at least partially at the second feed inlet 13. Portions of the filler may also be added at the second feed inlet 13. Polyvinyl acetate may be added via a powder feeder or the single screw extruder 42, or a twin screw extruder or gear pump, at the feed inlet port 14, while melted fats and waxes and oils are added at the last feed inlet 15. This will result in the filler, elastomer and plasticizer being subjected to highly dispersive mixing first before lower viscosity ingredients are added. The toothed elements 38, reverse elements 39 and shearing disk 40 after feed inlet 15 result in highly distributive mixing of all of the low viscosity gum base ingredients with the other gum base ingredients.

A preferred small scale extruder is a model LSM 30.34 counter-rotational, intermeshing and tangential twin screw extruder from Leistritz, Nürenberg, Germany. Other acceptable twin screw extruders include the Japan Steel Works Model TEX30HSS32.5PW-2V intermeshing co- and counter-rotating twin screw extruder, also known as the Davis Standard D-Tex Model, distributed by Crompton & Knowles Corporation, #1 Extrusion Dr., Pawcatuck, Conn. 06379, and either the co-rotating or counter-rotating intermeshing twin screw extruders from Werner & Pfleiderer Corporation, 663 E. Crescent Ave., Ramsey N.J. 07446. It is preferred to have a long barrel length. A Werner & Pfleiderer co-rotational twin screw extruder can go up to a length to diameter (L/D) ratio of 48. The Japan Steel Works Model TEX30HSS32.5PW-2V extruder may be equipped to have an L/D of 58.

EXAMPLE 1

Gum base was made on a continuous basis using a Leistritz model LSM 30.34 counter-rotational, intermeshing and tangential extruder in intermeshing mode with a barrel diameter of 30.3 mm set up with the following elements (given in order proceeding from first feed inlet to the output end of the extruder and using the Leistritz part designation for each element):

| | |
|---|---|
| FF-1-30-120 | (conveying element) |
| KFD-1-30/20-120 | (conveying and compression element) |
| FD-3-30-120 | (compression element) |
| ZSS-2-R4 | (toothed element) |
| ZSS-2-R4 | |
| KS | (shearing disk) |
| KS | |
| FF-1-30-120 | |
| KFD-1-30/20-120 | |
| FD-3-30-120 | |
| ZSS-2-R4 | |
| ZSS-2-R4 | |
| ZSS-2-R4 | |
| KS | |

The die at the end of the extruder had a 1 mm hole.

The extruder had two feeding zones, each one adjacent the FF-1-30-120 conveying elements. A powder blend of ground butyl rubber, calcium carbonate and terpene resin at a ratio of 6:23:17 was fed at a rate of 3 kg/hr in the first feed zone. Polyisobutylene at 50°–80° C. was also fed at the first feed zone at a rate of 0.39 kg/hr. A powder blend of 5 parts glycerol monostearate, 8 parts hydrogenated cottonseed oil, 5 parts hydrogenated soybean oil, 3 parts high molecular weight polyvinyl acetate and 21 parts low molecular weight polyvinyl acetate was fed into the second feeding zone at a rate of 2.74 kg/hr, along with a blend of 3 parts partially hydrogenated soybean oil and 3 parts lecithin heated to 30° C. and fed at a rate of 0.4 kg/hr. The temperature of the extruder housing during operation was as follows:

| Zone | 1 | 2 | 3 | 4 | 5 | 6 | 7 | Die |
|---|---|---|---|---|---|---|---|---|
| Set Temperature | 90° C. | 90° C. | 95° C. | 130° C. | 130° C. | 130° C. | 110° C. | |
| Actual Temperature | 90° C. | 99° C. | 95° C. | 130° C. | 130° C. | 130° C. | 110° C. (est.) | 115° C. (est.) |

The extruder was operated at a speed of 100 rpm and drew 9 amps. A chewing gum base was produced which had no rubber particles or segregated oil. However, some of the polyvinyl acetate was not fully incorporated. This would be incorporated as the base was used to make chewing gum, or if desired, could be eliminated by using a single screw extruder as a side feeder/pre-melter for the polyvinyl acetate.

EXAMPLE 2

The same extruder set up and temperatures as used in Example 1 were used to continuously make another chewing gum base. A powder blend of ground butyl rubber and calcium carbonate at a ratio of 15:31 was fed into the first zone at a rate of 3 kg/hr, along with polyisobutylene heated to 50°–80° C. and fed at a rate of 2.08 kg/hr. A powder blend of 22 parts low molecular weight polyvinyl acetate, 13 parts hydrogenated cottonseed oil, 3 parts glycerol monostearate and 13 parts hydrogenated soybean oil was fed into the second feed inlet at a rate of 6.63 kg/hr, along with partially hydrogenated soybean oil heated to 30°–60° C. and fed at a rate of 1.3 kg/hr. The extruder was operated at 100 rpm, and drew 7–8 amps. A complete chewing gum base was prepared, although it was not as well mixed as the base of Example 1 and there were difficulties in material accumulating at the second feed zone.

EXAMPLE 3

An Leistritz Model 30.34 twin screw extruder is setup as shown in FIG. 1, with the following elements (the numbers to the left in parenthesis represent reference numbers from FIG. 1):

| | |
|---|---|
| (31) | FF-1-30-120 |
| (32) | KFD-1-30/20-120 |
| (35) | FD-3-30-120 |
| (33) | ZSS-2-R4 |
| (34) | KS |
| (34) | KS |
| (34) | KS |
| (31) | FF-1-30-120 |
| (32) | KFD-1-30/20-60 |
| (35) | FD-3-30-120 |
| (36) | 18 kneading disks, stacked in 2 sets of 2 and 4 sets of 3, with a 90° set off between each set. |
| (31) | FF-1-30-60 |
| (32) | KFD-1-30/20-60 |
| (35) | FD-3-30-30 |
| (33) | ZSS-2-R4 |
| (33) | ZSS-2-R4 |
| (39) | FF-1-30-30 (set up for reverse operation) |
| (34) | KS |

The overall length of these elements is 1060 mm, giving a L/D for a 30.3 mm barrel of about 35.

The following ingredients are added at the following rates to the extruder 10 at the locations specified. The rates listed are for steady state operation.

| INGREDIENTS | % BY WEIGHT | FEED INLET LOCATION |
|---|---|---|
| Terpene resin (123° F. melting point) | 8.390 | 12 |
| Terpene resin (85° F. melting point) | 8.257 | 12 |
| Cocoa powder (<75 micron wet particle size) | 0.599 | 12 |
| Ground isobutylene-isoprene copolymer (120,000–150,000 MW, 2–7 mm diameter particle size) | 8.390 | 12 |
| Calcium carbonate (<12 micron particle size) | 20.908 | 12 |
| Polyisobutylene (12,000 M.W.) (heated to 100° C.) | 5.860 | 13 |
| Polyvinyl acetate (50,000–80,000 M.W.) | 2.663 | 14 |
| Polyvinyl acetate (25,000 M.W.) | 21.309 | 14 |
| Glycerol monostearate | 4.794 | 15 |
| Hydrogenated soybean oil | 4.528 | 15 |
| Lecithin | 3.329 | 15 |
| Hydrogenated cottonseed oil | 7.724 | 15 |
| Partially hydrogenated cottonseed oil | 3.196 | 15 |
| BHT | 0.053 | 15 |

The total feed rate is 25 lb/hr. The temperature is controlled so that the mixture is at about 115° C.–125° C.

While the examples have been given for relatively small scale operations, the process is readily scaled up. When using twin screw extruders, scale up is accomplished by using a larger barrel diameter, such as 6 inches, and a longer length, but maintaining the same L/D ratio. For an L/D of 45, a 6 inch barrel would be 22.5 feet in length. If larger machines generate more heat than can easily be removed, the rpm of the extruder may need to be reduced, or cooled shafts and mixing elements could be used. Also, by putting in some of the resin at the first feed zone, the heat generated during mixing should be reduced.

When conducting the experiment relating to Example 1, the polyisobutylene was originally added at the second feed inlet. This was possible during startup, but when the blend of fats and polyvinyl acetate were also added, the fats melted and lubricated the screws so that they no longer drew in the polyisobutylene. This is why the polyisobutylene is introduced at the first feed zone in Example 1.

In Examples 1 and 2, since the butyl rubber was ground before it was used, a portion of the filler and the ground butyl rubber were premixed (at a ratio of filler to butyl rubber of 1:3) to help keep the ground butyl rubber in a form that allowed it to be fed into the extruder as a powder blend. This filler was included in the overall ratios cited in the examples.

It should be appreciated that the methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A process for continuously producing a chewing gum base comprising the steps of:
    a) continuously adding chewing gum base ingredients, including an elastomer, a filler and a plasticizer into an extruder;
    b) subjecting the elastomer, the filler and the plasticizer to a highly distributive mixing operation within said extruder, thereby producing a chewing gum base, the amount of elastomer in the gum base being less than the amount of plasticizer in the gum base; and
    c) continuously discharging the chewing gum base from the extruder while chewing gum base ingredients continue to be simultaneously introduced and mixed within the extruder.

2. The process of claim 1 wherein the process is carried out in a counter-rotating, intermeshing twin screw extruder.

3. The process of claim 2 wherein the highly distributive mixing is accomplished by a plurality of toothed elements counter-rotating with respect to adjacent toothed elements.

4. The process of claim 1 wherein said chewing gum base ingredients are added to the extruder at two or more spatially separated points and the highly distributive mixing step is carried out in the extruder downstream of said points.

5. The process of claim 1 wherein at least a portion of said chewing gum base ingredients are subjected to a highly dispersive mixing operation upstream of the highly distributive mixing operation.

6. The process of claim 1 wherein the adding and mixing steps are controlled to operate at a steady state.

7. A method of continuously compounding chewing gum base in a twin screw extruder comprising the steps of:

a) feeding an elastomer and a filler into the extruder at a preselected ratio;
    b) subjecting the elastomer and the filler to a dispersive mixing processing section as it passes through the extruder;
    c) adding one or more additional gum base ingredients to the extruder downstream of said dispersive mixing processing section, and
    d) continuing mixing the one or more additional gum base ingredients with the elastomer and the filler using highly distributive mixing downstream of said dispersive mixing processing section to complete compounding of the gum base, the chewing gum base comprising a plasticizer and the elastomer being present in the gum base at a level less than the level of plasticizer.

8. The method of claim 7 wherein the additional gum base ingredients comprise the plasticizer.

9. The method of claim 7 wherein the elastomer and filler are supplied to the extruder at a first feed inlet location and the additional gum base ingredients are added at additional feed inlet locations downstream of the first inlet location and the highly distributive mixing occurs downstream of a last feed inlet location.

10. The method of claim 9 wherein the additional gum base ingredients added at said additional feed inlet locations comprise the plasticizer.

11. The method of claim 1 wherein the elastomer and filler are premixed before being continuously added to the extruder.

12. The process of claim 1 wherein the elastomer and filler have a residence time in the extruder of less than one hour.

13. The process of claim 7 wherein the elastomer and filler have a residence time in the twin screw extruder of less than one hour.

14. The process of claim 1 wherein the elastomer is brought into contact with the filler prior to any substantial mastication of the elastomer.

15. The process of claim 7 wherein the elastomer is brought into contact with the filler prior to any substantial mastication of the elastomer.

16. A process for producing chewing gum comprising continuously producing a chewing gum base using the process of claim 1 and thereafter mixing the gum base with a bulking and sweetening agent and a flavoring agent to produce the chewing gum.

17. The process of claim 1 wherein the average molecular weight of the elastomers in the chewing gum base is not less than the average molecular weight of the elastomers in a gum base made out of the same gum base ingredients but mixed into gum base using a conventional batch process.

18. The process of claim 7 wherein the average molecular weight of the elastomers in the chewing gum base is not less than the average molecular weight of the elastomers in a gum base made out of the same gum base ingredients but mixed into gum base using a conventional batch process.

19. The method of claim 1 wherein the plasticizer comprises a member selected from the group consisting of waxes, oils, fats and mixtures thereof.

20. The method of claim 7 wherein the plasticizer comprises a member selected from the group consisting of waxes, oils, fats and mixtures thereof.

* * * * *

UNITED STATES PATENT AND TRADEMARK OFFICE
CERTIFICATE OF CORRECTION

PATENT NO. : 5,562,936
DATED : October 8, 1996
INVENTOR(S) : Joo H. Song et al.

It is certified that error appears in the above-indentified patent and that said Letters Patent is hereby corrected as shown below:

Title Page, in the title, item [54],

In column 1, line 3, replace "DISTRIBUTE" with --DISTRIBUTIVE--.

In column 2, line 4, under "OTHER PUBLICATIONS" replace "tast" with --taste--.

In column 5, line 21, after "out" insert --in--.

Signed and Sealed this

Eighth Day of December, 1998

Attest:

BRUCE LEHMAN

*Attesting Officer*     *Commissioner of Patents and Trademarks*